United States Patent
Kastinger

(10) Patent No.: US 6,888,272 B2
(45) Date of Patent: May 3, 2005

(54) UNIPOLAR TRANSVERSE MAGNETIC FLUX MACHINE

(75) Inventor: Guenter Kastinger, Gaggenau-Sulzbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/486,578

(22) PCT Filed: Aug. 1, 2002

(86) PCT No.: PCT/DE02/02825
§ 371 (c)(1),
(2), (4) Date: Sep. 24, 2004

(87) PCT Pub. No.: WO03/019756
PCT Pub. Date: Mar. 6, 2003

(65) Prior Publication Data
US 2005/0062352 A1 Mar. 24, 2005

(30) Foreign Application Priority Data
Aug. 16, 2001 (DE) .......................... 101 40 303

(51) Int. Cl.⁷ ........................... H02K 37/24; H02K 1/00
(52) U.S. Cl. ..................... 310/49 R; 310/216; 310/254
(58) Field of Search .............................. 310/49 R, 49 A, 310/257, 156.64, 256, 255, 152, 258, 259, 254, 156.55, 156.22, 216–218, 178, 179, 182–183, 197, 51, 91, 261; 29/596; 318/696, 685

(56) References Cited

U.S. PATENT DOCUMENTS

| | | | | |
|---|---|---|---|---|
| 2,519,097 A | * | 8/1950 | Allen | 310/168 |
| 4,127,802 A | * | 11/1978 | Johnson | 318/696 |
| 4,255,696 A | * | 3/1981 | Field, II | 318/696 |
| 4,306,164 A | * | 12/1981 | Itoh et al. | 310/49 R |
| 4,423,343 A | * | 12/1983 | Field, II | 310/49 R |
| 4,517,478 A | * | 5/1985 | Oudet | 310/49 R |
| 4,518,883 A | * | 5/1985 | Oudet | 310/49 R |
| 4,703,243 A | * | 10/1987 | Ettelman et al. | 318/696 |
| 5,006,748 A | * | 4/1991 | Wintermute | 310/258 |
| 5,436,518 A |   | 7/1995 | Kawai | |
| 5,747,898 A | * | 5/1998 | Yoshimura et al. | 310/49 R |
| 6,166,471 A | * | 12/2000 | Kometani et al. | 310/198 |
| 6,304,010 B1 | * | 10/2001 | Sugiura | 310/49 R |
| 6,657,329 B2 | * | 12/2003 | Kastinger et al. | 310/49 R |
| 2002/0171315 A1 | * | 11/2002 | Kastinger | 310/254 |
| 2004/0046478 A1 | * | 3/2004 | Zierer et al. | 310/216 |
| 2004/0075357 A1 | * | 4/2004 | Kastinger et al. | 310/156.02 |

FOREIGN PATENT DOCUMENTS

| | | | | |
|---|---|---|---|---|
| DE | 36 02 687 A | * | 8/1987 | |
| DE | 3927454 | * | 2/1991 | |
| DE | 196 14 862 A | * | 11/1997 | |
| EP | 02237451 | * | 7/1989 | |
| EP | 0 544 200 A1 | * | 6/1993 | |
| EP | 0 942 517 A | * | 9/1999 | |
| FR | 2 091 565 | | 1/1972 | |
| GB | 6673090 | * | 3/1950 | |
| JP | 61-69364 | * | 4/1986 | |
| JP | 10-126982 | * | 5/1998 | |
| WO | WO 97 42699 A | * | 11/1997 | |
| WO | WO 97/42699 | | 11/1997 | |
| WO | WO 02/09261 A1 | * | 1/2002 | |

* cited by examiner

Primary Examiner—Nicholas Ponomarenko
Assistant Examiner—Heba Y. Elkassabgi
(74) Attorney, Agent, or Firm—Ronald E. Greigg

(57) ABSTRACT

In a unipolar transverse flux machine, to attain a modular structure favorable in terms of production, the stator and the rotor each have the same number of identical stator modules and rotor modules. Each stator module includes an annular coil, disposed coaxially to the rotor shaft, and U-shaped stator yokes fitting over the annular coil. To achieve a high static torque, each rotor module comprises two rotor rings with external toothing, and the rotor rings surround two radially oppositely magnetized permanent magnet rings, which in turn are seated on a common flux-conducting element, which is formed for instance by the rotor shaft produced from ferromagnetic material.

21 Claims, 2 Drawing Sheets

UNIPOLAR TRANSVERSE MAGNETIC FLUX MACHINE

CROSS-REFERENCE TO RELATED APPLICATIONS

This application is a 35 USC 371 application of PCT/DE 02/02825 filed on Aug. 1, 2002.

BACKGROUND OF THE INVENTION

1. Field of the Invention

The invention is directed to an improved unipolar transverse flux machine.

2. Brief Description of the Prior Art

A known unipolar transverse flux machine is disclosed in European Patent Disclosure EP 0 544 200 A1 and refaced to in that publication as a hybrid synchronous machine with transverse magnetic flux. In this machine, the toothing of each rotor ring has one row of teeth extending along the outer circumference of the rotor ring, remote from the rotor axis, and another set of teeth extending along the inner circumference of the rotor ring, oriented toward the rotor axis, both rows having the same tooth pitch. The rows of teeth on each rotor ring are offset from one another by one tooth pitch. The yoke spacing on the stator corresponds to the tooth pitch of an inner or outer row of teeth, so that an outer tooth of one rotor ring and an inner tooth of the other rotor ring are always located simultaneously under one stator yoke. The two rotor modules, each comprising two rotor rings and one permanent-magnetic member for generating a radial magnetic flux in opposite directions in the rotor rings, are firmly fastened, on the sides remote from one another in the axial direction of the rotor, to a rotor body that is braced on the housing via rotary bearings. Each permanent-magnetic member is formed by a permanent magnet ring fastened between the rotor rings, which is magnetized unipolarly in the direction of the rotor axis. The stator yokes of each stator module that are received by the housing are U-shaped, and with their yoke legs oriented parallel to the rotor axis they fit over the inner and outer rows of teeth of the two rotor rings of the rotor modules. In each stator module, the circular annular coil, disposed concentrically to the rotor axis, passes through the stator yokes at the base of the yoke; that is, it is located in the region between the annular face of the outer rotor ring, pointing away from the rotor body, and the crosspiece of the stator yokes.

Transverse flux machines with permanent magnet excitation are known from the literature, such as Michael Bork, *Entwicklung und Optimierung einer fertigungsgerechten Transversalflussmaschine, Diss, 82, RWTH Aachen* [Development and Optimization of a Transverse Flux Machine Suitable for Production, Dissertation No. 82, Rheinland-Westfalen Technical University in Aachen], Shaker Verlag, Aachen, 1997, page 8 ff. The circularly wound stator winding is surrounded by U-shaped yokes of soft iron, which are disposed at twice the pole spacing in the direction of rotation. The open ends of these U-shaped yokes are aimed at the air gap between the stator and the rotor and form the poles of the stator. Facing them, tiny permanent magnet plates are disposed such that the two tiny plates that face the poles of a stator yoke have opposite polarity. For short-circuiting the permanent magnets, which upon rotor rotation are sometimes located between the poles of the stator and have no ferromagnetic short circuit, short-circuit elements are disposed in the stator. They prevent the flux of the permanent magnets from scattering via the yoke legs and the annular coil and lessening the effectiveness of the stator flux concatenation from attenuation of the stator flux. Thus the short-circuit elements lead to a marked enhancement of the performance of the machine.

In a unipolar transverse flux machine of the type defined at the outset, it has already been proposed (in German Patent Disclosure DE 100 39 466) that the toothing of the rotor rings be provided solely on the outer circumference of the rotor rings, facing away from the rotor axis, and that the stator yokes in the stator module be disposed such that one yoke leg of the stator yokes faces one rotor ring, while the other yoke leg of the stator yokes faces the other rotor ring, each with radial gap spacing. Between successive stator yokes in the direction of rotation of the rotor, a respective short-circuit element is disposed, which extends axially past both rotor rings and faces each of them with the same radial gap spacing. The permanent-magnetic member for generating a magnetic flux extending radially in opposite directions in the rotor rings is formed by a permanent magnet ring, which is fastened between the two rotor rings and is unipolarly magnetized in the axial direction of the rotor. A unipolar transverse flux machine of this kind has the advantage of simple modular construction, with which any desired number of branches of the machine can be achieved by adding or subtracting identically embodied stator modules and rotor modules, or in other words can be constructed in modular fashion. As the number of modular units, each composed of one stator module and one rotor module, increases, the concentricity of the machine is improved, and an initially indexing-like behavior of the machine changes over to continuous concentricity without ripples in the course of the moment. Since the total moment of the machine is the sum of the proportional moments of the module units, the total moment of the machine can be adapted easily to existing requirements.

SUMMARY AND ADVANTAGES OF THE INVENTION

The unipolar transverse flux machine of the invention has the advantage of greater static torque, with the same magnet volume of the permanent-magnetic member. With unchanged dimensions and the same design of the unipolar transverse flux machine, compared to the last unipolar transverse flux machine described in the previous paragraph, the average torque is thus increased.

By means of the provisions described, advantageous refinements of and improvements to the unipolar transverse flux machine are possible.

In an advantageous embodiment of the invention, the flux-conducting element joining the two permanent magnet rings to one another is formed by a hollow cylinder of ferromagnetic material, which is seated on the rotor shaft in a manner fixed against relative rotation and receives the two permanent magnet rings in a manner fixed against relative rotation. The rotor shaft is made from magnetically nonconductive material.

In a preferred embodiment of the invention, the flux-conducting element is formed directly by the rotor shaft itself, to which the two permanent magnet rings are attached. By the elimination of the separate flux-conducting element, the expense for components is reduced, but in that case there is the necessity of making the rotor shaft of ferromagnetic material.

In an advantageous embodiment of the invention, in a multi-branched version of the unipolar transverse flux machine, that is, in which a plurality of stator modules are seated on the ferromagnetic rotor shaft, the rotor shaft is subdivided into shaft portions, each extending across one rotor module, and solid disks of magnetically nonconductive material are disposed between the shaft portions. Shaft portions comprising solid disks result in a torsion-proof shaft. By means of these magnetically insulating solid disks, the rotor modules of the individual modular units or branches of the unipolar transverse flux machine are magnetically decoupled, so that no mutual magnetic influence can occur.

The same effect is attained in a multi-branched version of the unipolar transverse flux machine with a ferromagnetic rotor shaft, if in an alternative embodiment of the invention the axial spacings between the rotor modules are made greater than the axial width of the rotor modules. The optimum for the axial spacings is achieved when the magnetic influence between the rotor modules becomes negligibly slight.

BRIEF DESCRIPTION OF THE DRAWINGS

The invention is described in further detail herein below, with reference to the drawings, in which.

DESCRIPTION OF THE PREFERRED EMBODIMENTS

Figure 1:
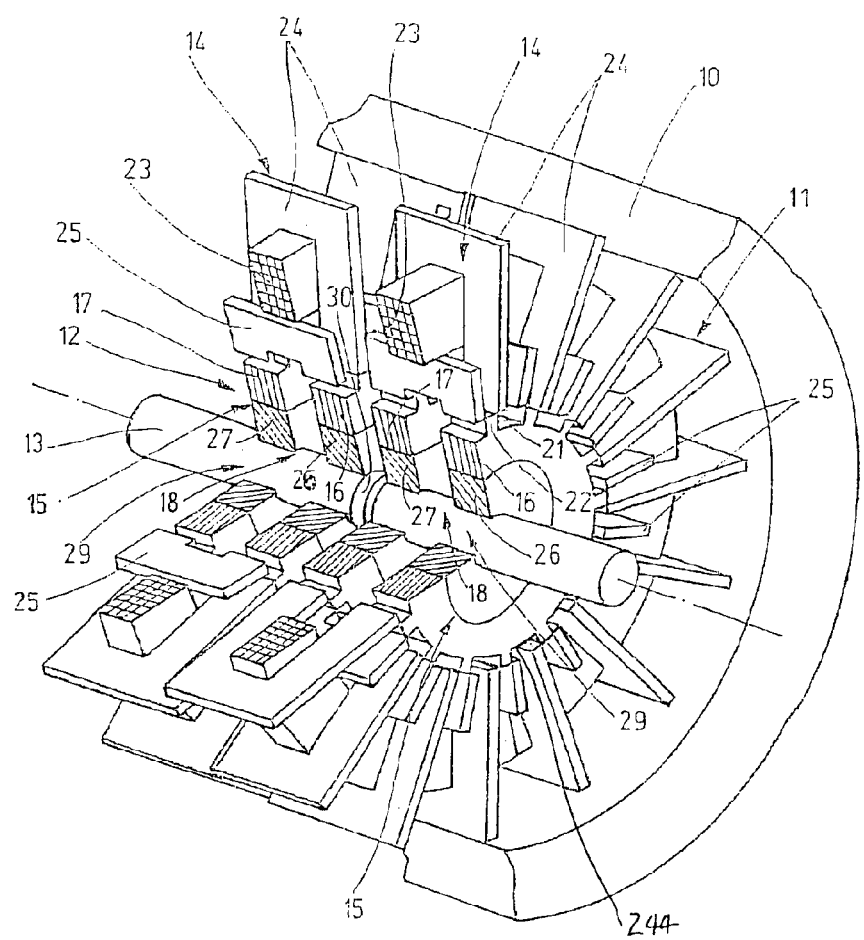
FIG. 1 is a detail, in perspective, of a two-branch, 32-pole unipolar transverse flux machine, shown partly schematically.

The unipolar transverse flux machine shown in perspective in FIG. 1, partly cut away, has a machine housing 10 with a stator 11 retained on it as well as a rotor 12 revolving in the stator 11; the rotor is seated in a manner fixed against relative rotation on a rotor shaft 13 supported in the machine housing 10. The rotor 12 has a plurality of rotor modules 15, and the stator 11 has an equal number of stator modules 14. The rotor modules 15 are mounted axially one after the other directly on the rotor shaft 13 in a manner fixed against relative rotation, and the stator modules 14 are secured to the machine housing 10 axially one after another in radial alignment with the associated rotor module 15. The number of modular units each including one stator module 14 and one rotor module 15 is determined by the selected number of branches of the unipolar transverse flux machine, which in the exemplary embodiment of FIG. 1 has two branches and accordingly has two modular units. However, it can also be single-branched or with three or more branches. The stator modules 14 and rotor modules 15 and thus the individual modular units are embodied identically, so that the unipolar transverse flux machine has a modular design, and by adding or subtracting modular units, it is no problem to make adaptations to existing requirements with regard to power and torque.

As shown in perspective in FIG. 1, in the two-branched version of the unipolar transverse flux machine, the two rotor modules 15, seated axially side by side on the rotor shaft 13, of the two modular units are oriented in alignment with one another, and the two stator modules 14, disposed axially side by side in the machine housing 10, of the two modular units are rotated 90° electrically from one another, which is equivalent to one-half the pole spacing; that is, in the 32-pole version of the machine, this means a three-dimensional offset angle of 5.625° in the direction of rotation. Alternatively, it is possible to orient the two stator modules 14 axially in alignment with one another and to rotate the rotor modules 15, seated on the rotor shaft 13, by the aforementioned angle of 90° electrically from one another.

If the unipolar transverse flux machine is embodied with more than two branches, or in general with m branches, where m is a whole number greater than 2, then the stator modules 14 disposed axially one after the other on the stator 11 should be shifted electrically relative to one another by an angle of 360°/m, or in other words, in a three-branched machine with three modular units, by 120° electrically.

Figure 2:
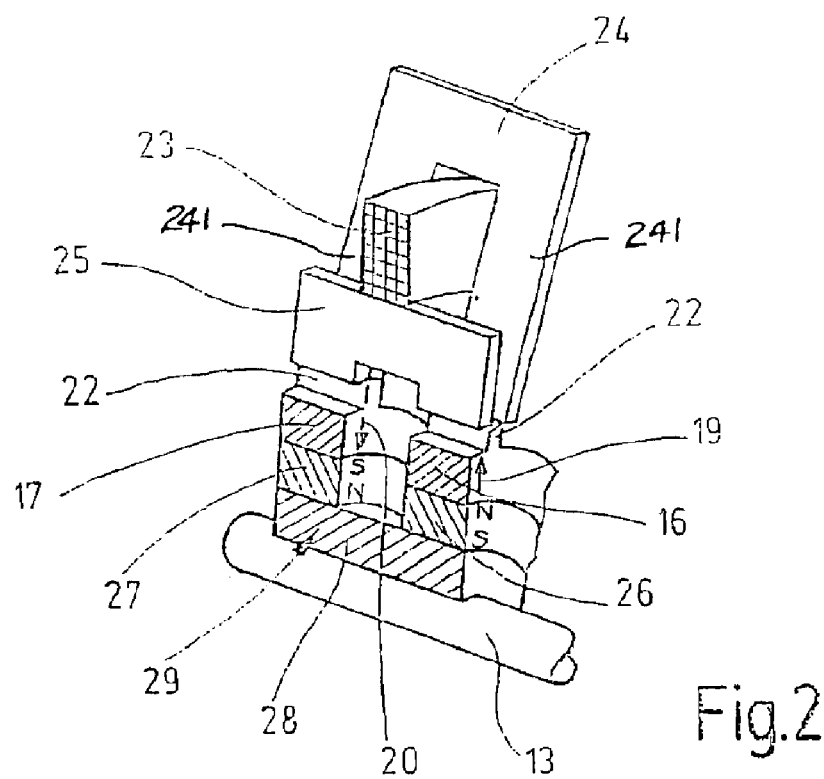
FIG. 2, a perspective elevation view of a fragment of a unipolar transverse flux machine that is modified compared to FIG. 1.

Each rotor module 15 has two coaxial, toothed, ferromagnetic rotor rings 16, 17 and one permanent-magnetic member 18, which generates a magnetic flux that extends radially in opposite directions in the rotor rings 16, 17, as indicated in FIG. 2 by the arrows 19, 20. The permanent-magnetic member 18 comprises two permanent magnet rings 26, 27, which are each surrounded on the outside by a respective rotor ring 16 and 17, and one flux-conducting element 29, which connects the two permanent magnet rings 26, 27 to one another. In the exemplary embodiment of FIG. 1, the flux-conducting element 29 is formed by the rotor shaft 13, which is made of ferromagnetic material and to which the two permanent magnet rings 26, 27 are attached, spaced apart axially from one another. Each permanent magnet ring 26, 27 is magnetized radially; the direction of magnetization is opposite in the two permanent magnet rings 26, 27, as indicated in FIG. 2 by the north pole N and south pole S of the two permanent magnet rings 26, 27. If more than one rotor module 15 is seated on the rotor shaft 13, or in other words if the unipolar transverse flux machine is two-branched, as in FIG. 1, or has more than two branches, then it is advantageous for the individual rotor modules 15 to be decoupled by means of solid disks of magnetically nonconductive material disposed in the rotor shaft 13. In FIG. 1, one such magnetically insulating solid disk 30 is inserted between the portions, each carrying one rotor module 15, of the rotor shaft 13. Alternatively, the spacing between the rotor modules 15 seated on the one-piece rotor shaft 13 can be increased to such an extent that the magnetic influence of the individual branches on one another is negligible.

Each rotor ring 16, 17 is toothed with a constant tooth pitch on its outer circumference, facing away from the rotor shaft 13, so that the teeth 22, each separated from one another by a tooth gap 21, of the resultant row of teeth have the same angular spacing from one another. The teeth 22 on the rotor ring 16 and on the rotor ring 17 are aligned axially with one another. The rotor rings 16, 17 with the teeth 22 integrally formed onto them are laminated and are preferably assembled from identical stamped pieces of sheet metal, which rest against one another in the axial direction.

Each stator module 14, concentrically surrounding one rotor module 15 with radial spacing, has an annular coil 23 disposed coaxially with the rotor shaft 13 and also has U-shaped stator yokes 24, which fit over the annular coil 23, and short-circuit elements 25, which are located below the annular coil 23. The also-laminated stator yokes 24 and short-circuit elements 25, which are both put together from stamped sheet-metal pieces to form sheet-metal laminations, are attached to the machine housing 10 with a yoke or short-circuit element spacing corresponding to the tooth pitch on the rotor module 15, so that they have the same angular spacing from one another as the teeth 22 of the rotor rings 16, 17. The stator yokes 24 are disposed here in such a way that one yoke leg 241 is radially aligned with one rotor ring 16, and the other yoke leg 241 is radially aligned with the other rotor ring 17 of the associated rotor module 15, and the free end faces 244 of the yoke legs that form the pole faces are located facing the respective rotor ring 16 and 17 with radial gap spacing. In the exemplary embodiment, the end faces of the yoke legs have the same axial width as the rotor rings 16, 17. However, end faces of the yoke legs that protrude axially on one or both sides past the rotor rings 16, 17 are advantageous. The short-circuit elements 25 are each disposed between two stator yokes 24 in the direction of rotation of the rotor 12 and are offset from the stator yokes 24 by one-half the yoke or short-circuit element spacing, or one pole spacing. The short-circuit elements 25 extend parallel to the rotor shaft 13 to beyond both rotor rings 16, 17 and face the rotor rings with the same radial gap spacing as the stator yokes 14 do.

In the exemplary embodiment of FIG. 1, the short-circuit elements 25 are for instance C-shaped, each with two legs radially facing a respective rotor ring 16, 17 and with a crosspiece joining the legs that extends parallel to the rotor shaft 13 on the inside, facing toward the rotor shaft 13, of the circularly embodied annular coil 23. In order to save material or to gain clearance, alternative shapes for the short-circuit elements 25 can be selected, such as rectangular or trapezoidal. Because of this embodiment of the short-circuit elements 25 and stator yokes 24, the circular annular coil 23 passes between the stator yokes 24 at the base of the yoke legs and onward past each short-circuit element 25. The axial width of the end faces of the legs of the short-circuit elements 25 here is equal to the axial width of the rotor rings 16, 17. However, the legs of the short-circuit elements 25 can also protrude axially past the rotor rings 16, 17.

Figure 3:
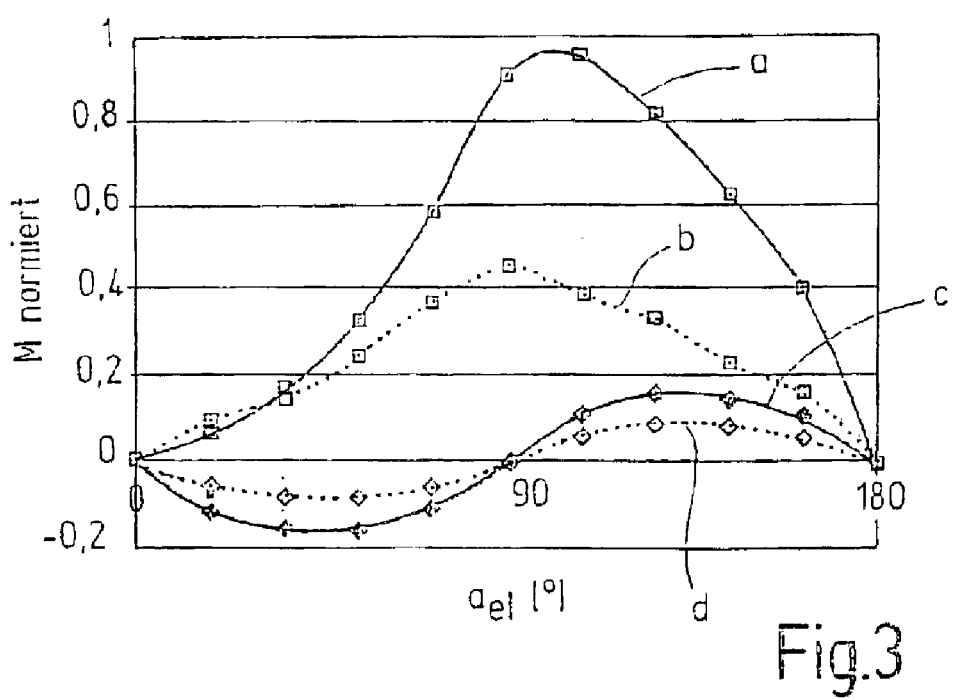
FIG. 3, a graph showing the course of the torque in the unipolar transverse flux machine of FIG. 1 or FIG. 2, in comparison to a known machine.

In FIG. 3, a graph is shown as an example with four courses of moment over an electrical angle of 180°. Curve a shows the course of the static torque of the unipolar transverse flux machine of FIG. 1, and curve b shows the course of the static torque of a unipolar transverse flux machine as it occurs, given the same design, in the unipolar transverse flux machine of DE 100 39 466, in which the permanent-magnetic member 18 is formed not by two permanent magnet rings 26, 27 magnetized radially in opposite directions but instead by one permanent magnet ring, disposed between the rotor rings 16, 17 and magnetized in the axial direction of the rotor 12. It can be seen clearly that the average torque is increased, in the machine described here.

Curves c and d represent the course of the resting moment of the unipolar transverse flux machine of FIG. 1 (curve c) and of the aforementioned known unipolar transverse flux machine (curve d). Once again, an increase in the resting moment can be seen.

In the modified 32-pole unipolar transverse flux machine, shown only in fragmentary form in FIG. 2, the two permanent magnet rings 26, 27 are not mounted directly on the rotor shaft 13 but instead are mounted in a manner fixed against relative rotation, with equal axial spacing from one another, on a hollow cylinder 28 of ferromagnetic material, which in turn is received by the rotor shaft 13 in a manner fixed against relative rotation. Because of this hollow cylinder 28, which forms the flux-conducting element 29 of the permanent-magnetic member 18 between the two permanent magnet rings 26, 27 that are magnetized radially in opposite directions, a magnetically conductive embodiment of the rotor shaft 13 can be dispensed with. In the case of a multi-branched version of the unipolar transverse flux machine, the individual rotor modules 15, seated on the one-piece rotor shaft 13 of magnetically nonconductive material, are magnetically well decoupled and can be disposed close together, in order to attain a low axial structural depth of the unipolar transverse flux machine.

The foregoing relates to preferred exemplary embodiment of the invention, it being understood that other variants and embodiments thereof are possible within the spirit and scope of the invention, the latter being defined by the appended claims.

What is claimed is:

1. A unipolar transverse flux machine, comprising a rotor (12) which is rotatable about a rotor axis and having at least one rotor module (15), each rotor module including two coaxial, toothed, ferromagnetic rotor rings (16, 17) and a permanent-magnetic member (18) for generating a magnetic flux extending radially in opposite directions into the rotor rings (16, 17), a stator (11) which is concentric with the rotor axis and having at least one stator module (14) associated with the rotor module (15), the stator module (14) including an annular coil (23), disposed coaxially to the rotor axis, and U-shaped stator yokes (24) fitting over the annular coil, a toothing of the rotor rings (16, 17) provided solely on the outer circumference, facing away from the rotor axis, of the rotor rings (16, 17), the stator yokes (24) of the stator module (14) including yoke legs disposed such that their yoke legs (241) each face one of the rotor rings (16) with radial gap spacing, and the permanent-magnetic member (18) being formed by two permanent magnet rings (26, 27) magnetized radially in opposite directions, the permanent-magnetic members (18) each being surrounded in a manner fixed against relative rotation by one rotor ring (16, 17) and being seated on a common flux-conducting element (29).

2. The machine of claim 1, wherein one short-circuit element (25) each is disposed between successive stator yokes (24) in the direction of rotation of the rotor (12) and extends axially across both rotor rings (16, 17) and faces them with radial gap spacing.

3. The machine of claim 2, wherein the toothing of the rotor rings (16, 17) has a constant tooth pitch, and the yoke legs are attached to a housing with a spacing that matches the tooth pitch.

4. The machine of claim 2, wherein the flux-conducting element (29) comprises a rotor shaft (13) of ferromagnetic material, to which the two permanent magnet rings (26, 27) are attached in a manner fixed against relative rotation.

5. The machine of claim 2, wherein that the flux-conducting element (29) is formed by a hollow cylinder (28) of ferromagnetic material, which receives both permanent magnet rings (26, 27) in a manner fixed against relative rotation and is seated in turn in a manner fixed against relative rotation on a rotor shaft (13).

6. The machine of claim 2, wherein the short-circuit elements (25) are offset from the stator yokes (24) by one pole spacing.

7. The machine of claims 2, wherein the radial gap spacing is the same size between the stator yokes (24) and the rotor rings (16, 17) on the one hand and between the short-circuit elements (25) and the rotor rings (16, 17) on the other.

8. The machine of claim 2, wherein the free end faces (244) of the legs of the stator yokes (24) have at least the same axial width as the rotor rings (16, 17), and preferably protrude past the rotor rings on one or both sides.

9. The machine of claim 1, wherein the toothing of the rotor rings (16, 17) has a constant tooth pitch, and the yoke legs are attached to a housing with a spacing that matches the tooth pitch.

10. The machine of claim 9, wherein the flux-conducting element (29) comprises a rotor shaft (13) of ferromagnetic material, to which the two permanent magnet rings (26, 27) are attached in a manner fixed against relative rotation.

11. The machine of claim 9, wherein that the flux-conducting element (29) is formed by a hollow cylinder (28) of ferromagnetic material, which receives both permanent magnet rings (26, 27) in a manner fixed against relative rotation and is seated in turn in a manner fixed against relative rotation on a rotor shaft (13).

12. The machine of claim 1, wherein the flux-conducting element (29) comprises a rotor shaft (13) of ferromagnetic material, to which the two permanent magnet rings (26, 27) are attached in a manner fixed against relative rotation.

13. The machine of claim 12, wherein the rotor (12) comprises two identical rotor modules (15), and the stator (11) comprises two identical stator modules (14); and wherein the stator modules (14) are fixed axially side by side in a housing (10), and the rotor modules (15) are fixed axially side by side on the rotor shaft (13), in a mutual association in each case such that the stator modules (14) or the rotor modules (15) are each rotated by 90° electrically from one another.

14. The machine of claim 13, wherein the rotor shaft (13) is subdivided into shaft portions each extending across one rotor module (15); and that solid disks (30) of magnetically nonconductive material are disposed between the shaft portions.

15. The machine of claim 13, wherein the axial spacings between the rotor modules are made so great that any magnetic influence between the rotor modules (15) is negligible.

16. The machine of claim 12, wherein the rotor (12) comprises m rotor modules (15) and the stator (11) comprises m stator modules (14); and wherein the stator modules (14) are fixed axially side by side in a housing (10), and the rotor modules (15) are fixed axially side by side on the rotor shaft (13), in a mutual association in each case such that the stator modules (14) or the rotor modules (15) are each rotated by 360°/m electrically from one another, and m is a whole number and is greater than 2.

17. The machine of claim 16, wherein the rotor shaft (13) is subdivided into shaft portions each extending across one rotor module (15); and that solid disks (30) of magnetically nonconductive material are disposed between the shaft portions.

18. The machine of claim 1, wherein that the flux-conducting element (29) is formed by a hollow cylinder (28) of ferromagnetic material, which receives both permanent magnet rings (26, 27) in a manner fixed against relative rotation and is seated in turn in a manner fixed against relative rotation on a rotor shaft (13).

19. The machine of claim 18, wherein the rotor (12) comprises two identical rotor modules (15), and the stator (11) comprises two identical stator modules (14); and wherein the stator modules (14) are fixed axially side by side in a housing (10), and the rotor modules (15) are fixed axially side by side on the rotor shaft (13), in a mutual association in each case such that the stator modules (14) or the rotor modules (15) are each rotated by 90° electrically from one another.

20. The machine of claim 18, wherein the rotor (12) comprises m rotor modules (15) and the stator (11) comprises m stator modules (14); and wherein the stator modules (14) are fixed axially side by side in a housing (10), and the rotor modules (15) are fixed axially side by side on the rotor shaft (13), in a mutual association in each case such that the stator modules (14) or the rotor modules (15) are each rotated by 360°/m electrically from one another, and m is a whole number and is greater than 2.

21. The machine of claim 1, wherein the free end faces (244) of the legs of the stator yokes (24) have at least the same axial width as the rotor rings (16, 17), and preferable protrude past the rotor rings on one or both sides.

* * * * *